United States Patent [19]

Ikoma et al.

[11] Patent Number: 4,897,829
[45] Date of Patent: Jan. 30, 1990

[54] CARDLIKE OPTICAL RECORDING MEDIUM

[75] Inventors: Keiko Ikoma; Noriko Kurihara, both of Yokohama; Keiji Hirabayashi; Susumu Itoh, both of Tokyo, all of Japan

[73] Assignee: Canon Kabushiki Kaisha, Tokyo, Japan

[21] Appl. No.: 121,112

[22] Filed: Nov. 16, 1987

[30] Foreign Application Priority Data

Nov. 20, 1986 [JP] Japan ................... 61-275354

[51] Int. Cl.$^4$ .............................. G11B 7/24
[52] U.S. Cl. ...................... 369/288; 428/634; 428/686; 428/408; 430/271; 430/273; 369/286
[58] Field of Search ............ 428/634, 636, 408, 411.1, 428/412; 369/283, 284, 286, 288; 430/271, 273, 14, 495

[56] References Cited

U.S. PATENT DOCUMENTS

| | | | |
|---|---|---|---|
| 4,335,173 | 6/1982 | Caraballo | 369/288 |
| 4,590,493 | 5/1986 | Inoue et al. | 369/283 |
| 4,658,388 | 4/1987 | Ishiwatari et al. | 369/284 |
| 4,673,626 | 6/1987 | Takeda et al. | 430/14 |
| 4,717,622 | 1/1988 | Kurokawa et al. | 428/408 |
| 4,774,130 | 9/1988 | Endo et al. | 428/408 |
| 4,833,031 | 5/1989 | Kurokawa et al. | 429/408 |

FOREIGN PATENT DOCUMENTS 208056  9/1986  Japan .................. 430/271

*Primary Examiner*—L. Dewayne Rutledge
*Assistant Examiner*—George Wyszomierski
*Attorney, Agent, or Firm*—Fitzpatrick, Cella, Harper & Scinto

[57] ABSTRACT

A cardlike optical recording medium comprises a substrate, a recording layer and a protective layer, wherein an ultra-hard film containing a carbon atom is provided at least on the side of said optical recording medium on which a laser beam for writing-reproducing is irradiated.

7 Claims, 2 Drawing Sheets

CARD LIKE OPTICAL RECORDING MEDIUM

CARDLIKE OPTICAL RECORDING MEDIUM

BACKGROUND OF THE INVENTION

1. Field of the Invention

The present invention relates to a cardlike optical recording medium.

2. Related Background Art

In recent years, as society is progressively informationalized, various information recording carriers and optical information recording-reproducing apparatus for optically recording and reproducing information, including optical discs, optical cards, optical tapes, etc., have been proposed as a means for dealing with a great variety of information with high efficiency. The above information recording carriers include those which can detect the binary-coded information and convert it to the change of strength of reflectance, a change of strength of reflected light which is accompanied with a change of surface shape corresponding to the presence or absence of pits (holes), or a change of polarized light surface by magnetooptic effect. These information recording carriers are advantageous because they can achieve high recording density and can perform non-contact recording-reproducing, and therefore can enjoy a long life.

Developments have been extensive in recent years in respect to cardlike information recording carriers (hereinafter referred to as optical cards) such that they now have good portability and a large capacity as compared with their size.

The optical recording medium is basically comprised of a substrate, a recording layer and a protective layer, and may further have various protective layers laminated for the purpose of improving thermal resistance, moisture resistance, light-resistance, abrasion resistance and so forth. Since scratches formed on the surface of the recording side face of the optical recording medium, or rubbish or dust stuck thereon, may cause a change of optical characteristics such as reflectance producing noise in reproducing signals, accordingly, it is necessary to form a hard protective layer coating having abrasion or scratch resistance; partcularly in the case of an optical card used in a form or environment such that the surface is liable to be scratched as compared with the optical disc.

For the purpose of increasing the recording density or enhancing the reliability of recording, an optical disc further generally has a complicated layer constitution such as the air-sandwich structure, and also has a substrate or protective layer of a sufficient thickness.

On the other hand, the optical card has a simple layer constitution in order to achieve a reduced thickness, and has a thinly formed substrate or protective layer.

However, because of the thinness of the upper layer of the recording layer, it is hard for an optical system for reproducing data to defocus the rubbish or dust stuck on the surface of the recording medium or the scratches made thereon, making it difficult to separate noise signals and recording signals. This is a disadvantage.

SUMMARY OF THE INVENTION

An object of the present invention is to solve the problems that conventional optical cards have had, and to provide a cardlike optical recording medium that can prevent scratches on the face on which a laser beam is incident, can enhance the reliability of signals for reproducing the recorded information and can improve the S/N ratio, by providing, in an optical card of reduced thickness having a simple layer construction, an ultra-hard film (or coating) as a protective outer layer on the side on which the laser beam is irradiated.

According to the present invention, there is provided a cardlike optical recording medium comprising a substrate, a recording layer and a protective layer, wherein an ultra-hard film containing a carbon atom is provided at least on the side of said optical recording medium on which a laser beam for writing-reproducing is irradiated.

DETAILED DESCRIPTION OF THE INVENTION

Figure 1:
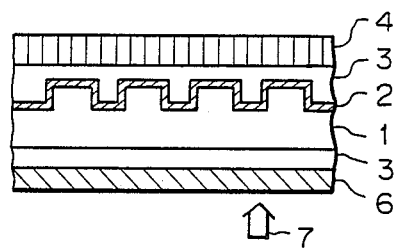
FIG. 1, FIG. 2 and FIG. 3 are cross-sections illustrating working embodiments of the present invention.

In the present invention, the ultra-hard film is a coating containing a diamond phase and/or an amorphous carbon phase. The cardlike optical recording medium provided with a layer of this ultra-hard film can achieve a good arrangement of information bits and may cause any rewriting owing to a laser beam during reproduction. This is because diamond has good thermal conductivity so that this ultra-hard film can externally dissipate the heat accumulated in the part of the recording layer irradiated by the laser beam for writing-reproducing. As a result, the writing and reproducing of information can be performed with good precision.

Also, because of the hardness of the diamond, the cardlike optical recording medium of the present invention can be free from the wear of its surface, can achieve improved S/N ratio and can be free from scratches. Accordingly, no error in the reading of any auto tracking signals may be caused, and the recording of information and/or the reproducing of recorded information can be carried out with accuracy.

A process for producing the ultra-hard film will be described below. This film chiefly composed of carbon, can be formed by the known plasma CVD process, ion beam deposition process or ion plating process. Such a process includes, for example, the rf-plasma CVD process, the microwave CVD process and the magnetic-field-bearing plasma CVD process. Also included is the ion beam deposition process in which the film formation is performed by accelerating carbon-containing ions from an ionic source in the electric field in the form of a beam. In this process and also in the other above processes, the film can be formed by applying a voltage on the substrate.

A starting carbon-containing gas component may include hydrocarbons such as methane, ethane, propane, butane, ethylene, benzene, and toluene, alcohols such as methanol, ethanol and propanol, as well as ketones, amines and amides. There can be also used those in which one of the above carbon-containing organic gasses has been substituted with halogen atom(s) in part or in entirety, such as $CHCl_3$, $CCl_4$, $CH_2F_2$ and $CH_3COCCl_3$. It is also possible to use the carbon-containing gas by mixing it with one or more of $H_2$ and rare gases.

Together with the abrasion resistance and scratch resistance (hardness), the ultra-hard film is preferably required to have flexibility so that no peeling or cracking may occur even when the optical card is bent. This may occur because the cardlike optical recording medium is frequently carried around either by putting it in a case or as it is. In view of this, the film chiefly composed of carbon may preferably be endowed with both hardness as in a polycrystalline film of diamond and flexibility as in an a-C:H film which is highly amorphous and has a rich hydrogen content. The ultra-hard film endowed with both of these properties in an appropriate state may include films having an amorphous phase containing a finely crystalline phase of diamond to the extent that the hardness may not be lowered, or films in which no mixing of crystalline phase is observed by electron ray diffraction and which is amorphous in the long-range order and is very close to diamond in the short-range order. Also, in films having appropriate scratch resistance and flexibility, being highly amorphous and having a small hydrogen content, it is desired that they have a transmittance as high as possible to the laser beam for writing-reproducing. In view of this, the film may contain a graphite phase or a glassy carbon phase to the extent that the transmittance to the wavelength of the laser beam to be used may not be extremely lowered, but preferred are those in which the peak has a half-width of 50 cm$^{-1}$ or less originating from SP$^2$ carbon which may not appear at 1550 cm$^{-1}$ to 1650 cm$^{-1}$ in the Ramans spectrum. The hydrogen content may preferably be in the range of 0.1 atom % to 40 atom %, more preferably 1 atom % to 30 atom %, taking account the scratch resistance, i.e., the hardness, of the ultra-hard film.

Figure 6:
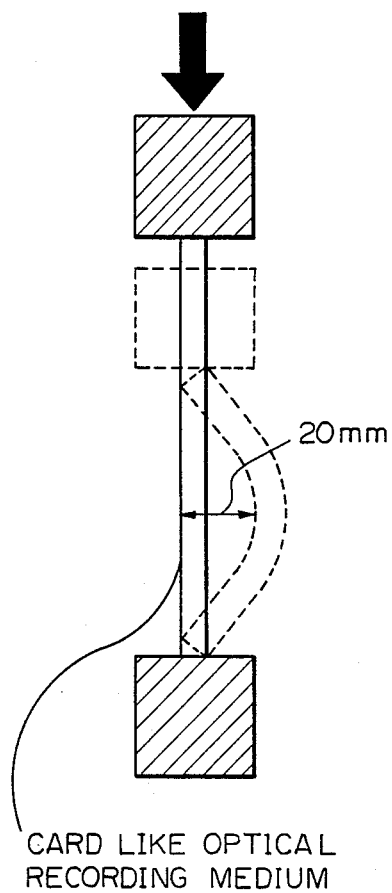
FIG. 6 is a view showing a manner for a flexibility test.

With regard to flexibility, buckling stress was applied, as shown in FIG. 6, to an optical card from the top and bottom sides (where the optical card is stood with its long side part sideways) until the middle part of the optical card was bent 20 mm and thereafter released to restore the optical card to the original state. Preferred optical cards are those in which no crack or wrinkle is formed on the surface of the ultra-hard film even after repeating the above operation 1,000 times.

The ultra-hard film may preferably have a film thickness of 0.01 to 2 μm, particularly preferably 0.1 to 20 μm, taking account of the thickness for making the optical card easy to handle and the flexibility of the ultra-hard film.

Figure 2:
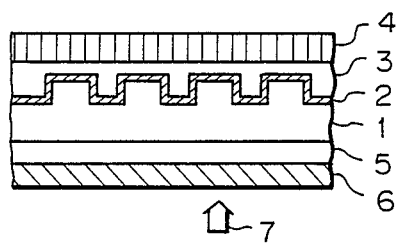
Figure 3:
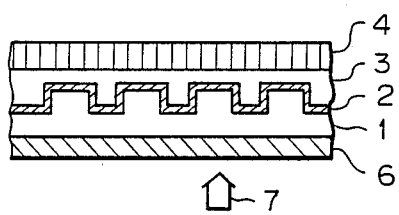

FIG. 1 to FIG. 3 illustrate working embodiments of the cardlike optical recording medium provided with a layer of the ultra-hard film formed in the above manner according to the present invention. The present invention does not limit the constitution of the optical cards for the layers other than the ultra-hard film. In the drawings, the numeral 1 denotes a transparent substrate; 2, a recording layer; 3, an adhesive layer; 4, a protective layer; 5, a support layer; 6, the ultra-hard film; and an arrow 7, the incident ray of a laser beam for writing-reproducing. Here, the ultra-hard film is provided at least on the face of the optical recording medium on which the laser beam is irradiated; in other words, on the outermost layer of the cardlike optical recording medium having the substrate, recording layer and protective layer on which the laser beam for writing-reproducing is irradiated, for example. This is the substrate side or the protective layer side.

FIG. 1 illustrates an example in which the ultra-hard film 6 is provided through interposition of the adhesive layer 3 on the substrate 1 corresponding to the side on which the laser beam 7 for recording-reproducing is irradiated.

FIG. 2 illustrates an example in which the ultra-hard film 6 is formed on the support 5 and laminated on the transparent substrate 1 together with the support. This construction is taken when there is a problem in the adhesion between the ultra-hard film 6 and the adhesive layer 3 in the example of FIG. 1.

FIG. 3 illustrates an example in which the ultra-hard film 6 is directly formed and laminated on the transparent substrate 1. This construction, having no adhesive layer and support layer, unlike the examples of FIGS. 1 and 2, may give less interfaces at which the laser beam is reflected or refracted, and makes it possible to effectively utilize the laser beam to be irradiated. However, the transparent substrate must be of material endurable to a high temperature at the time of the formation of the ultra-hard film 6.

The transparent substrate 1 may preferably be of material that may have less difficulties in optical recording-reproducing, and may be of any material so long as it has a high transmittance to the light to be used. For example, there can be used acrylic resins, polyester resins, polycarbonate resins, vinyl resins, polysulfone resins, polyimide resins, polyacetal resins, polyolefin resins, polyamide resins, cellulose derivatives, etc.

As materials for the protective layer, there can be used any material than can usually be used for protective layers, specifically including polyvinyl chloride, fluorine-substituted ethylene polymers, vinyl chloride/vinyl acetate copolymers, polyvinylidene chloride, acrylic polymers such as polymethyl methacrylate, polystyrene, polyvinyl butyral, acetyl cellulose, styrene/butadiene copolymers, polyethylene, polypropylene, polycarbonate, epoxyacrylonitrile/butadiene/styrene copolymers, etc.

In some cases, it is possible to use various kinds of materials depending on the purpose of use, including metallic sheet made of iron, stainless steel, aluminum, tin, copper, zinc, etc., synthetic paper, paper, fiber-reinforced plastics, composite materials such as magnetic materials comprising metallic powder and plastics, ceramics, etc. Of course, those used for the transparent substrate may also be used.

The recording layer used in the present invention may comprise, for example, organic coloring matters such as cyanine type coloring matters, anthraquinone type coloring matters, merocyanine type coloring matters and transition metal complexes (for example, diamine type metal complexes, dithiol type metal complexes), or materials obtained by introducing any of these into a polymer, and also chalcogen compounds such as Bi, Te and alloys of these.

The recording layer can be laminated by coating, vapor deposition, spraying or the like.

As materials for the support layer 5 used in the example of FIG. 2, there can be used, for example, SiO$_2$, hydrocarbon polymers produced by plasma polymerization, a-C:H (amorphous carbon hydride) obtained by CVD process, glass, etc.

The adhesive layer 3 may comprise adhesives of, for example, a vinyl acetate type, a vinyl acetateacrylic type, a vinyl acetate copolymer type, a vinyl acetate emulsion type, an acrylic type, an acrylate type, an acrylic copolymer type, an ethylene type, an ethylene-vinyl acetate type, an ethylene-vinyl acetate copolymer type, a polyethylene type, a methylene chloride type, a polyamide type, a polyamide-amine type, a polyimide type, a urea type, an epoxy type, an epoxy-urethane type, an epoxy-acrylate type, an urethane-acrylate type, a polyester type, a chloroprene type, a chloroprene rubber type, a nitrile type, a nitrile rubber type, a urethane type, a vinyl urethane type, a polyurethane type, an olefin type, a cyanoacrylate type, an alkyl acrylate type, a vinyl chloride type, a phenol type, an SBR (styrene butadiene rubber) type, a polyol type, a silica-alumina type, a synthetic rubber type, an emulsion type, an oligoester type, a cellulose type, a formaldehyde type, an ultraviolet-curable type, an organic solvent, a styrene-butadiene type adhesive, a Freon TA type, etc. Those requiring energy such as heat, light, electron rays or the like in effecting adhesion can be also used effectively so long as such energy may not deteriorate the function of the optical recording material.

When the coloring matters and the like are used in the recording layer, it is necessary to use those which may not adversely affect the recording layer.

As described in the above, in the cardlike optical recording medium according to the present invention, the ultra-hard film surface containing a carbon atom is provided on the surface on which a laser beam for writing-reproducing is irradiated. so that it is possible to improve the abrasion resistance and scratch resistance, to prevent the S/N ratio from being lowered by abrasion or the auto tracking signals from being erroneously read owing to scratches, and to obtain accurate signals for reproducing the recorded information. Moreover, since this ultra-hard film has flexibility, the cardlike optical recording medium of the present invention can prevent the ultra-hard film from being peeled or broken when it is bent.

EXAMPLES

The present invention will be described below by Examples, but the invention is by no means limited by these.

First, a cardlike optical recording medium was prepared using the present invention. On a polycarbonate substrate of 54 mm wide, 86.5 mm long and 0.7 mm thick, as a transparent substrate, track grooves were formed by hot pressing. Subsequently, as a recording layer, a merocyanine type coloring matter was coated on the face of these track grooves by bar coating, followed by drying to form a thin film of 0.1 μm thick. The optical recording material thus obtained was laminated on a protective layer comprising polymethyl methacrylate in the manner that the optical recording layer may be in contact therewith, through interposition therebetween of an adhesive layer comprising an adhesive of an ethylene-vinyl acetate type, and the resulting laminate was contact-bonded by using a heat fixing roll heated to 90° to 160° C. to produce a cardlike optical recording medium.

EXAMPLE 1

A parallel flat plate type RF plasma CVD device was used in producing an ultra-hard film. NaCl crystals were used as a substrate, which was on the RF electrode side. $C_2H_4$ and $H_2$ as starting gasses in the mixing ratio of 1:10 were introduced, and, keeping the pressure at 0.08 Torr., discharge was effected under RF power of 700 W at a substrate temperature of 400° C. to form a ultra-hard film of 1 μm thick on the substrate.

The resulting film had a hydrogen content corresponding to the hydrogen atom number percentage of 15%, and a transmittance of 97% to the light of 780 nm. No diamond of crystalline state was present according to electron ray diffraction, and a peak was detected at 1560 $cm^{-1}$ in the Raman spectrum, but with small strength and having a half width of 120 $cm^{-1}$. After the substrate NaCl of this film was melted and removed, the film was adhered with use of a vinyl acetate type adhesive on the substrate of the optical recording medium produced by the process described above.

EXAMPLE 2

A microwave CVD device was used and NaCl crystals were used as a substrate. Acetone and $H_2$ as starting gasses in the mixing ratio of 5:95 were introduced and the pressure was set to 1 Torr. Substrate temperature was kept at 650° C. and discharge was effected under 300 W. There was obtained a film of 1 μm thick, on which ring patterns of diamond were detected according to electron ray diffraction. No peak having a maximum value at at 1550 to 1650 $cm^{-1}$ was detected in the Raman spectrum. Hydrogen content was 5 atom %, and the transmittance at 780 nm was 95%. In the same manner as in Example 1, the film was adhered on the optical recording medium mentioned above.

EXAMPLE 3

In the device same as in Example 2, a magnetic field of 1,800 Gauss at maximum was applied, and a-C:H was used as a substrate (a support layer). $CCl_4$ and $H_2$ in the mixing ratio of 1:1 were introduced and the pressure was set to 0.1 Torr. While keeping the substrate temperature at 300° C., a discharge was effected under 300 W to obtain a film of 0.1 μm thick.

Electron ray diffraction detected weak ring patterns, which were insufficient for being identified as diamond. No peak was detected at 1550 to 1650 $cm^{-1}$ in Raman spectrum. The transmittance at 780 nm was 92%.

Next, an acrylate type monomer was poured into a pregrooved mold, and a substrate bearing the diamond film previously produced was pressed down against the monomer, which was then photo-cured by irradiation from a mercury lamp of high pressure mercury. Subsequently, the mold was peeled to prepare a substrate comprising polyacrylate pregrooves made on one face of the substrate and the diamond film coated on the opposite face.

A merocyanine type coloring matter was coated on the pregrooved side, and a protective layer of PMMA was adhered thereon to obtain a cardlike optical recording medium.

EXAMPLE 4

Using the device same as in Example 1, a substrate bias of −150 V was applied. As starting material, 100% $C_2H_4$ was used, and the pressure was set to 0.05 Torr. The substrate was one in which polycarbonate was used for the substrate for use in the optical recording medium, and, keeping the substrate temperature at 120° C., discharge was effected under 500 W. The resulting film was 0.3 μm thick and was not crystalline. A peak was detected at 1570 cm$^{-1}$ in Raman spectrum, but the half-width was 150 cm$^{-1}$. Hydrogen content was 20 atom % and the transmittance at 780 nm was 90%.

On the opposite side to the side of this substrate on which the carbon film was formed, track grooves were formed by hot pressing, following procedures entirely the same as those described above for the preparation of an optical recording medium.

EXAMPLE 5

A Kaufmann type ion beam device was used here for the formation of an ultra-hard film. The substrate used was the same as the one used in Example 4. As starting material, 100% $CH_4$ was introduced, and the pressure was kept at $1 \times 10^{-4}$ Torr. Film was formed keeping the substrate temperature at 60° C., and the ion acceleration voltage at 400 V. The resulting film was 0.2 μm thick and was not crystalline. Hydrogen content was 15 atom % and Raman spectrum was very broad, having a maximum value at 1500 cm$^{-1}$. The transmittance at 780 nm was 90%.

Thereafter, Example 4 was repeated to prepare an optical recording medium.

COMPARATIVE EXAMPLE 1

Figure 4:
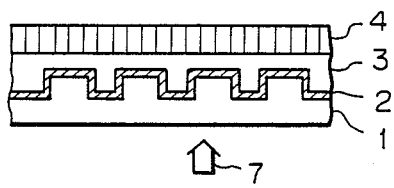
FIG. 4 and FIG. 5 are explanatory views for Comparative Examples 1 and 2.

On a polycarbonate substrate of 54 mm wide, 85.6 mm long and 0.7 mm thick, as a transparent substrate, track grooves were formed by hot pressing. Subsequently, as a recording layer, a merocyanine type coloring matter was coated on the face of this track grooves by bar coating, followed by drying to form a thin film of about 0.1 μm thick. The optical recording material thus obtained was laminated on a protective layer comprising polymethyl methacrylate in the manner that the optical recording layer may be in contact therewith, through interposition therebetween of an adhesive layer comprising an adhesive of an ethylene-vinyl acetate type, and the resulting laminate was contact-bonded by using a heat fixing roll heated to 90° to 150° C. to produce a cardlike optical recording medium (FIG. 4).

COMPARATIVE EXAMPLE 2

Figure 5:
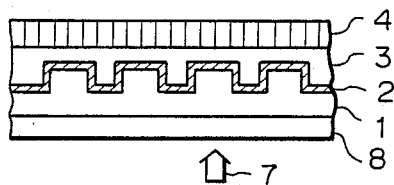

On a substrate of an optical recording medium produced in the same manner as in Comparative Example 1, a modified acrylic resin layer was provided as a hard coat 8 (FIG. 5).

The flexibility, scratch resistance and abrasion resistance of the optical cards prepared in the above Examples 1 to 5 and Comparative Examples 1 and 2 were evaluated in the following manner.

(1) Abrasion resistance:

Carried out was abrasion resistance tests in which steel wool was reciprocated 100 times on the surface of the ultra-hard film, the hard coat or the substrate under load of 100 to 150 g/m$^2$. As a result, as shown in the table following, due to the abrasion of the surface, it became impossible to read the tracking signals after 20 times in respect of the recording medium having no coating on the substrate, and after 50 times in respect of the recording medium provided with the hard coat comprising a modified acrylic resin. In contrast thereto, in the case of the recording media of Examples 1 to 5, no difficulty in the reading of tracking signals occurred even after 100 times.

(2) Scratch resistance:

Next, to observe scratch resistance, the hardness of the substrate, hard coat and ultra-hard film was measured. For the measurement of this hardness, Moh's scale of hardness was used.

The substrate showed a hardness of 1 or less, and the hard coat showed a hardness of 2. In contrast thereto, the ultra-hard file showed a hardness of 7 to 9. This proves that the ultra-hard film has a very high scratch resistance.

(3) Flexibility:

Next, in respect of the optical cards of Comparative Example 2 in which the hard coat was provided on the substrate of the side of the light-incidence face and those of Examples 1 to 5 in which the ultra-hard film was provided thereon, the flexibility of the hard coat and the respective ultra-hard films was tested.

More specifically, buckling stress was applied, as shown in FIG. 6, to the optical cards from the top or bottom sides (where the optical card is stood with its long part sideways) until the middle part of the optical card was bent by 20 mm, and thereafter released to restore the optical card to the original state. This operation was repeated 1,000 times to observe whether cracks or wrinkles were formed on the surfaces of the hard coat and ultra-hard film. Results obtained are shown in the table following.

| | Abrasion resistance | Scratch resistance (hardness) | Flexibility |
|---|---|---|---|
| Example: | | | |
| 1 | No difficulty in read-out of tracking signals even after abrasion resistance test | 8 | No crack or wrinkle seen |
| 2 | No difficulty in read-out of tracking signals even after abrasion resistance test | 9 | No crack or wrinkle seen |
| 3 | No difficulty in read-out of tracking signals even after abrasion resistance test | 7 | No crack or wrinkle seen |
| 4 | No difficulty in read-out of tracking signals even after abrasion resistance test | 8 | No crack or wrinkle seen |
| 5 | No difficulty in read-out of tracking signals even after abrasion resistance test | 9 | No crack or wrinkle seen |
| Comparative Example: | | | |
| 1 | Tracking became impossible on 20 times | 1 or less | No crack or wrinkle seen |
| 2 | Tracking became impossible on 50 times | 2 | No crack or wrinkle seen |

It is seen from the above results that the optical cards according to the present invention are satisfactory for the three points, the abrasion resistance, scratch resistance and flexibility.

We claim:

1. In a cardlike optical recording medium comprising a transparent substrate having on one side, in sequence, a recording layer adapted to have information written thereupon and reproduced by a laser beam, and a protective layer subject to scratching or contamination, the improvement comprising providing on a second side of said transparent substrate an ultra-hard outer layer comprising a laser beam transmittable carbon matrix having at least one of an amorphous carbon phase to impart flexibility or a diamond phase to enhance hardness.

2. The cardlike optical recording medium of claim 1, wherein said ultra-hard outer layer contacts said transparent substrate.

3. The cardlike optical recording medium of claim 1, including an adhesive layer interposed between said ultra-hard outer layer and said substrate.

4. The cardlike optical recording medium of claim 1, wherein said ultra-hard outer layer contacts a support layer, said recording medium including an adhesive layer interposed between said substrate and said support layer.

5. The cardlike optical recording medium of claim 1, wherein said ultra-hard outer layer has a hydrogen content of 0.1 to 40 atom %.

6. The cardlike optical recording medium of claim 1, wherein said ultra-hard outer layer has a thickness of 0.01 to 20 μm.

7. A cardlike optical recording medium according to claim 1, wherein the ultra-hard outer layer has a transmittance of 780 nm light of at least 90%.

* * * * *